J. F. PLACE.
ART OR PROCESS OF SEPARATING THE GASES OF AIR.
APPLICATION FILED JUNE 8, 1915.
1,205,477.
Patented Nov. 21, 1916.
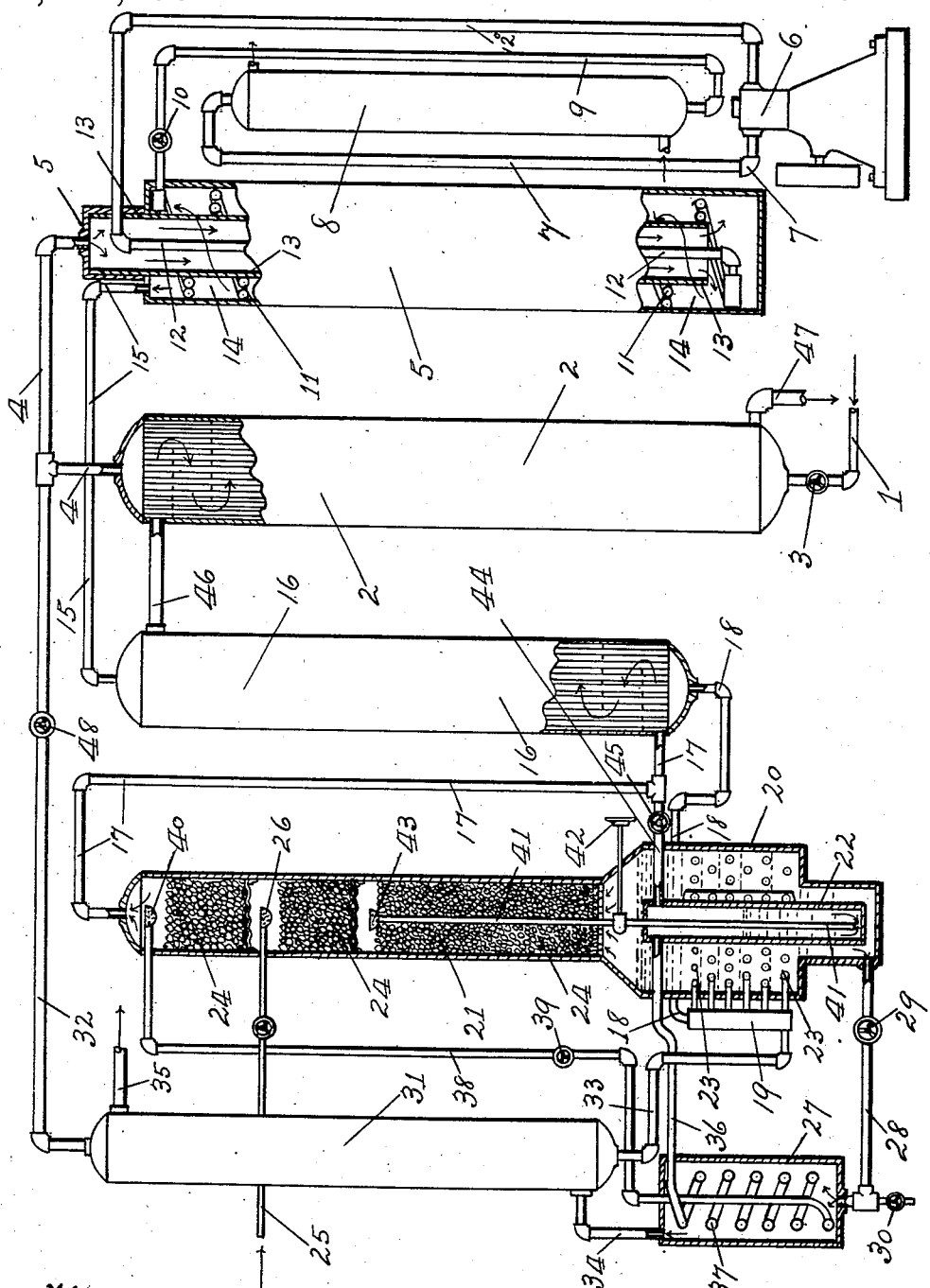
Witnesses:
Inventor

UNITED STATES PATENT OFFICE.

JAMES F. PLACE, OF GLEN RIDGE, NEW JERSEY, ASSIGNOR TO AMERICAN AIR-LIQUEFYING COMPANY, OF NEW YORK, N. Y., A CORPORATION OF NEW YORK.

ART OR PROCESS OF SEPARATING THE GASES OF AIR.

1,205,477.   Specification of Letters Patent.   Patented Nov. 21, 1916.

Application filed June 8, 1915. Serial No. 32,863.

*To all whom it may concern:*

Be it known that I, JAMES F. PLACE, a citizen of the United States, and resident of Glen Ridge, in the county of Essex and State of New Jersey, have invented certain new and useful Improvements in the Art or Process of Separating the Gases of Air, of which the following is a specification.

This invention relates to the processes of rectification of air, or its separation into its constituents oxygen and nitrogen.

One object of my invention is to provide a process by which the separation of a gaseous mixture, such as air, into its constituent parts may be more efficiently effected.

Another object of my invention is to cheapen the cost of the operation and thereby cheapen the cost of the separation of the gases of the mixture.

In order that those skilled in the art may understand and make use of my invention, I will describe my improved process by the aid of the accompanying drawing, in which is shown a diagrammatic view partly in elevation and partly in vertical section, of the apparatus used to put in operation the process.

Similar reference marks refer to similar parts throughout the drawing.

Air compressed to a tension of about 6 to 7 atmospheres (or say at about 80 lbs. gage pressure) is supplied through the pipe 1. The air should be compressed, then water-cooled, and then subjected to the chemical action of calcium chlorid, slaked lime and caustic potash, so that the moisture and carbon dioxid gas, and oil, dust and other deleterious substances are removed or absorbed therefrom. The apparatus for thus compressing and treating the air are not shown in the drawing, for such compression and subsequent treatment are well-known to engineers and the mechanical appliances for such are common. Air previously subjected to a compression of about 6 to 7 atmospheres and freed from $CO_2$ gas, moisture and other impurities is delivered from pipe 1 to the auxiliary heat interchanger drum 2 through the valve 3. This interchanger drum 2 is filled with small copper tubes which deliver the compressed air to the pipe 4 at the top; from thence it is delivered through the branch pipe 4' to the pre-cooling drum 5. This pre-cooling drum is arranged so as to cool the air by carbon-dioxid or nitrous oxid, to a temperature of from —60° Fahr. to —130° Fahr.;—the $CO_2$ or $N_2O$ being in liquid form, and boiling as released from pressure. This cooling is done with either $CO_2$ gas or $N_2O$ gas (preferably the latter) by compressing the gas to about 70 atmospheres, and then condensing the compressed gas while under compression, by subjecting it to water-cooling, and then releasing the liquefied gas to near atmospheric pressure, and causing it to absorb its latent heat of evaporation from a moving column of air.

A compressor for compressing $CO_2$ or $N_2O$ gas is shown at 6. The gas as compressed to about 70 atmospheres (its critical pressure) is delivered through pipe 7 to the condenser 8; here it is cooled by running water and thereby liquefied, for the critical temperature is 98° Fahr. for $N_2O$ and 88° Fahr. for $CO_2$—both temperatures being considerably above the normal temperature of water in summer. The liquefied gas is forced up through pipe 9 and is released through the expansion valve 10; the released liquefied gas passes into the helical coils 11, where it is evaporated, and thence is delivered to the vertical pipe 12 and is returned through pipe 12' to the compressor 6, and is recompressed, thus being used over and over again. The compressed air from branch pipe 4' being partially cooled in the auxiliary heat interchanger 2, passes into the insulating fiber conduit 13, and thence into the helical passage 14 and out through pipe 15; thus it will be seen the air passes down through the insulating tube 13 and up through the helical passage 14, in contact with the pipe 12 and the coils 11, and at all times in a contrary direction or in a counter-current to the boiling liquefied gas in the helical coils 11 and the pipe 12, so that the latent heat of evaporation of the $N_2O$ or $CO_2$ is taken from the moving column of compressed air. Whatever the temperature of this air may be as it enters the pre-cooling drum 5 from pipe 4', it is pretty sure to leave the drum and enter the outlet pipe 15, at the same temperature as the boiling liquefied gas in the top coils of the helical coils 11.

From pipe 15 the air enters the primary nitrogen interchanger drum 16, which is built very similar to auxiliary drum 2. Here (in drum 16) the air is still further cooled down close to the temperature of liquefaction by the cold expanded nitrogen gas from the rectifier outlet pipe 17. The compressed air passes from the drum 16 into the header 19.

At 20 I show a low-pressure evaporating reservoir for the rectifier proper 21; and inclosed in this reservoir (20) I have a high-pressure bottle 22. This bottle (22) is connected with the header 19, by numerous small flat spiral coils 23 located in substantially horizontal planes, which nearly fill the space in the reservoir 20 around the bottle 22, submerged at all times in and considerably below the level of the liquefied gas in the evaporating reservoir 20.

The upper part of the rectifying column 21 is filled with small hollow aluminum balls 24. At 25 I show a liquid-air supply pipe, which is supplied with liquid air from an outside source, and delivers the same through the sprinkler head 26 to the rectifying column 21, from which it drips down through the aluminum balls 24 to the evaporating reservoir 20. This reservoir in operating is kept filled with liquefied gas to above the top of the high pressure bottle 22.

At 27 I show a liquefied oxygen tank, which is supplied with liquefied oxygen from the bottom of the evaporating reservoir 20, through connecting pipe 28 and valve 29; and at 30 I have a draw-off cock, so that liquefied oxygen may be drawn off for outside use or sale. At 31 I have a small thermal interchanger which receives air of about 80 lbs. gage pressure, from branch pipe 32, through valve 48 and delivers it to the rectifying header 19, through pipe 33; this air is cooled by cold oxygen gas from pipe 34, which is evaporated from the liquefied oxygen in tank 27. The oxygen gas after rising in temperature to normal, is collected at the outlet conduit 35. At 36 I have a pipe leading from the top of the high-pressure bottle 22, which enters the liquefied oxygen tank 27 and is coiled therein as shown at 37. The pipe 38 leading from the upper end of the tank 27 is a continuation from the lower end of the coil 37 as shown. If the valve 39 be properly adjusted all of the gases which are rich in nitrogen are liquefied in the coil 37 and are discharged therefrom through the pipe 38 and sprinkler head 40 into the upper end of the rectifying column 21. When the valve 48 is open cold compressed air also enters the header 19 through the pipe 32, thermal interchanger 31 and pipe 33. The air delivered from pipes 33 and 18 into the header 19 passes therefrom into the flat coils 23.

The authorities are not agreed as to the question of fractional or preferential condensation of the air. The drops of liquefied gases which are formed in the liquefying coils 23 may at first be composed of a liquid rich in oxygen or may be liquefied air. These drops are directly in the path of the incoming streams of cold compressed air which are moving forward in the said coils to occupy the spaces of the previously liquefied portions of the air. Such forwardly moving air impinges on the liquid drops previously formed, envelops and physically contacts with them and impels them onward through the said liquefying coils toward the bottle 22. As a result of such simultaneous forward and onward movement of the liquefied and unliquefied portions of the air with the unliquefied portions enveloping and impinging upon the liquefied portions, there is a continuous progressive washing so to speak of the liquefied portions. Consequently the unliquefied portions of the air in the said coils is progressively impoverished in oxygen and the liquefied portions progressively enriched in oxygen, the liquefied portions giving off portions of their nitrogen in exchange for such oxygen. As a result of the process as immediately above set forth a continuous action and reaction between the liquefied and unliquefied portions of the air takes place so that the process of liquefaction and separation of the constituents of the air becomes very efficient.

The unliquefied portion of gas which enters the pipe 36 (when the valve 39 is opened) from the upper end portion of the bottle 22 is the more volatile of the constituents of the gaseous mixture being separated into its constituent parts and in the case of air consists of almost pure nitrogen gas, the purity depending on the dimensions of the flat horizontal coils 23 and the velocity with which the air travels through said coils. The residual nitrogen gas moves forwardly through the pipe 36 into the coils 37 where it may be partially or wholly liquefied, depending upon the adjustment of valve 39. As already stated the nitrogen gas liquefied in the coils 37 is discharged into the top of the rectifying column 21.

I have a siphon outlet tube 41 in the bottle 22, and by opening the valve 42 the liquid in the bottle (22) is forced up through this siphon tube and is delivered to the rectifying column through the sprinkler head 43. I also have an outlet pipe 44 from the top of the bottle 22, connecting through valve 45 with the main rectifier outlet conduit 17 for use as required in releasing the unliquefied nitrogen gas in the top of bottle 22.

As the liquid boils in the reservoir 20 (at practically atmospheric pressure), the vapors and gases ascend up into the rectifying column 21 through the aluminum balls 24, and come in contact with the descending liquids from the sprinklers 43, 26 and 40, and the oxygen of such gases is liquefied and falls back into the reservoir, and the nitrogen of the descending liquids is vaporized and passes out as unliquefied gas from the top of the column, as shown through the conduit 17; from thence these cold gases pass into the lower end of the primary thermal interchanger 16, further cooling the incoming pre-cooled compressed air, and then pass out through conduit 46 into the top of the auxiliary interchanger 2, and out into the atmosphere through outlet pipe 47 from the lower end of said auxiliary interchanger, at the same or nearly the same temperature as the compressed air entering through inlet pipe 1. In this way the greatest possible efficiency is attained, for the full advantage of pre-cooling the compressed air by liquefied $CO_2$ or $N_2O$ released from pressure, is availed of; and by carrying the residue of the cold expanded air (after its oxygen has been extracted therefrom in the rectifier, and it has been utilized to further cool the compressed air in the primary interchanger 16) through the auxiliary interchanger 2 (where it cools the compressed air before it enters the main $CO_2$ or $N_2O$ pre-cooler), I am able to return all of the unliquefied gases to the atmosphere at practically the same temperature as the air first taken from the atmosphere, besides availing of $CO_2$ or $N_2O$ cooling, which is the cheapest method of procuring refrigeration.

By closing valves 48 and 39, the oxygen interchanger drum 31 and the nitrogen liquefying coils 37, are cut out from the process; and the oxygen separated from the air treated may be drawn off through valve 29 and cock 30, as a liquid. While this method of production causes a loss of cooling the air which passes through the small interchanger drum 31 (about one-fifth of the air treated in the rectifier), yet the oxygen produced and sold being in liquid form, is much more compact and more easily handled, and the expense of compressing it as a gas into steel cylinders as commercial oxygen is now marketed, is entirely saved—which more than offsets the loss of utilizing the oxygen vapor for cooling in the drum 31 as aforesaid. Besides, in marketing the product as a liquid the cost of the steel cylinders or containers is entirely avoided, (which usually represents more than half the capital invested), and the element of danger surrounding the transportation and handling of steel containers charged with a gas under a tension of upward of 120 atmospheres (about 1800 lbs. to the square inch) is also entirely eliminated.

Having thus described my invention, what I claim as new and original and desire to secure by Letters Patent, is—

1. The process of separating the oxygen from the nitrogen of air, which comprises compressing and cooling air, and forcing the same while compressed through spiral tubes, located substantially in horizontal planes, and submerged in liquefied oxygen of substantially atmospheric pressure, delivering the same from said tubes to a receiver also submerged in said liquefied oxygen and conveying the more volatile of the constituents from said receiver, substantially as described.

2. The process of liquefying air and separating its constituents, oxygen and nitrogen, which consists of compressing air and removing the heat of compression, moisture and carbon dioxid gas therefrom; then cooling the same by a counter-current of partially reheated gases, the products of rectification of air previously liquefied; and further cooling said compressed air by subjecting the same to the refrigerative effect of boiling liquefied gas as released from pressure; and still further cooling said compressed air by the cold gaseous products of rectification of air previously liquefied, before being partially re-heated as aforesaid, and then passing the same while compressed through but not in physical contact with liquefied air or oxygen liquid at or near to atmospheric pressure and causing thereby evaporation thereof and the liquefaction of the said compressed air.

3. The process of liquefying air and separating its constituents, oxygen and nitrogen, which consists of compressing air and removing the heat of compression, moisture and carbon dioxid gas therefrom; then cooling the same by a counter-current of partially reheated gases, the products of rectification of air previously liquefied; and further cooling said compressed air by subjecting the same to the refrigerative effect of boiling liquid gas as released from pressure; and still further cooling said compressed air, by the cold gaseous products of rectification of air previously liquefied, before being partially re-heated as aforesaid; and then passing the same while compressed and cooled as aforesaid through but not in physical contact with liquefied air or oxygen liquid at or near to atmospheric pressure, and causing thereby evaporation thereof and separating the more readily liquefiable portions of said compressed air from the more refractory or less easily liquefiable portions thereof; and finally liquefying the latter by passing the same when compressed through but not in physical contact with a body of liquefied oxygen, thereby causing said oxygen liquid to evaporate.

4. In the process herein described, the method of cooling compressed air successively—first by the partially re-heated nitrogenous gaseous products of rectification; and second, by pressure-released boiling liquefied N₂O; and third, by the aforesaid nitrogenous gaseous products of rectification before being partially re-heated.

5. The process of separating the constituents of air, oxygen and nitrogen, comprising the method of compressing air and removing the heat of compression, carbon dioxid gas and moisture therefrom, and then cooling the same, successively: first, by the partially re-heated nitrogenous gaseous products of rectification at or near to atmospheric pressure; second, by boiling liquid nitrous oxid released from pressure; and third, by the aforesaid nitrogenous, gaseous products of rectification before being partially re-heated.

6. The process of separating the constituents of air, namely oxygen and nitrogen, which comprises the method of compressing air and removing the heat of compression, carbon dioxid gas and moisture therefrom, and then cooling said compressed air by successive counter-currents of—first, a counter-current of partially re-heated nitrogenous expanded gases; and, second, a counter-current of boiling liquefied gas, released from pressure; and third, a counter-current of the colder nitrogenous gaseous products of rectification of liquefied air.

7. The process of separating the constituents of air, namely oxygen and nitrogen, which comprises the method of compressing air and removing the heat of compression, carbon dioxid gas and moisture therefrom, and then cooling said compressed air by successive counter-currents of—first, a counter-current of partially re-heated nitrogenous expanded gases; and second, a counter-current of boiling liquefied gas, released from pressure; and third, a counter-current of the colder nitrogenous gaseous products of rectification of liquefied air at substantially atmospheric pressure.

8. The process of separating air into its constituents and producing the same in the form of liquefied oxygen and nitrogen gas which comprises compressing and cooling air and passing it while under compression through tubes submerged in liquefied oxygen gas released from pressure portions of which liquefied oxygen were previously liquefied in said submerged tube, discharging the air from the said tubes into a receiver also submerged in said liquefied oxygen gas and separating the unliquefied from the liquefied portions of gases in the said receiver.

9. The process of liquefying a gaseous mixture and separating the more readily liquefiable constituent from the more volatile constituent which consists in conveying the said mixture while under compression through one or more tubes situated in a chamber and submerged in a liquefied portion of the more readily liquefiable constituent of the mixture, liquefying all or portions of the said gaseous mixture in the said tube or tubes and discharging the same into a receptacle also submerged in the said liquefied portion, conveying the more volatile constituent of the said mixture from the said receptacle and thereafter liquefying the same and discharging the same after liquefaction into a rectifying column and also discharging the liquefied portion of the said mixture from the said receptacle into the said column at a point below the point of discharge of the liquefied more volatile constituent and collecting the more readily liquefiable constituent in the said chamber.

10. The process of liquefying and separating air into its constituent parts, oxygen and nitrogen, which consists in compressing and cooling the air and delivering the same to one or more coiled tubes situated in a chamber and submerged by liquefied oxygen therein, discharging the same from the said tubes into a receptacle also situated within said chamber and submerged in the liquefied oxygen therein and conveying unliquefied gaseous portions of the air from the said receptacle, liquefying the same and discharging it after liquefaction into a rectifying column, and also conveying the liquefied portions of the air from the said receptacle and discharging the same into the said rectifying column at a point below the point of discharge of the second-named liquefied portion and causing the liquefied oxygen to be collected in the said chamber and conveying the unliquefied nitrogen and other gases from the said rectifying column.

11. The process of liquefying air and separating the same into its constituent parts, oxygen and nitrogen, which consists in compressing and cooling the same and thereafter delivering it to a plurality of substantially flat spiral horizontally arranged coils submerged in liquefied oxygen previously liquefied in said coils, the liquefied and unliquefied portions of air within the said coils moving forward in the same direction therein and impinging and contacting with each other, the unliquefied portions of air giving up portions of its oxygen to the liquefied portions the whole being discharged into a receptacle also submerged in the said liquefied oxygen, conveying gas rich in nitrogen from the said receptacle, thereafter liquefying the same and discharging it into a rectifying column and thereafter conveying liquefied gas rich in oxygen from the said receptacle and discharging the same into the said rectifying column at a point below the point of discharge of the second-named liquefied portion, liquefied oxygen being collected at the bottom of said column and nitrogen gas being conveyed therefrom, substantially as described.

12. The process of liquefying air and separating it into its constituent parts, oxygen and nitrogen, which consists in compressing the same and thereafter cooling portions thereof by the cold vapors of oxygen and nitrogen resulting from the separation, and delivering the same while under compression to a plurality of tubes situated in a chamber and submerged in a volume of liquefied oxygen previously liquefied in whole or in part in said tubes, and discharging the liquefied portions and the unliquefied portions (if there be any) from the said tubes into a receptacle also situated within the said chamber and submerged in the said liquefied oxygen therein, conveying unliquefied gaseous portions of air from the upper end of said receptacle and conducting the same through a tube extending through a volume of liquefied oxygen and thereby effecting vaporization of the latter and conducting the vapor thus produced through a counter-current drum to pre-cool portions of the air to be liquefied and also effecting liquefaction of the portions of gas which are passed through said tube and conducting such liquefied portions to the upper part of a rectifying column and discharging the same thereinto and also discharging liquefied portions of air from said receptacle into the said rectifying column at a lower point therein and conveying the nitrogen gas from the said rectifying column to a pre-cooling drum to pre-cool other portions of the air to be liquefied.

13. The method of separating air into its constituent parts which consists in cooling the same successively,—first by the action of partially reheated nitrogenous gaseous products of rectification; second by the action of boiling liquefied gas released from pressure; third by the action of the aforesaid nitrogenous gaseous products of rectification before the partial reheating of the same; and thereafter liquefying the same and separating the oxygen and nitrogen by rectification.

Signed at New York city in the county of New York and State of New York this first day of June A. D. 1915.

JAMES F. PLACE.

Witnesses:
J. G. GADSDEN,
CLARENCE PLACE.